(12) United States Patent
Yamamoto et al.

(10) Patent No.: US 11,268,218 B2
(45) Date of Patent: Mar. 8, 2022

(54) WOVEN FABRIC

(71) Applicant: DAIKI CO., LTD., Sakai (JP)

(72) Inventors: Takayoshi Yamamoto, Sakai (JP);
Junnji Ikeda, Toyonaka (JP);
Takamasa Yamada, Kariya (JP);
Mitsutaka Sakoh, Kariya (JP)

(73) Assignee: DAIKI CO., LTD., Sakai (JP)

( * ) Notice: Subject to any disclaimer, the term of this patent is extended or adjusted under 35 U.S.C. 154(b) by 194 days.

(21) Appl. No.: 16/222,987

(22) Filed: Dec. 17, 2018

(65) Prior Publication Data
US 2019/0186059 A1 Jun. 20, 2019

(30) Foreign Application Priority Data

Dec. 19, 2017 (JP) .............................. JP2017-243312
Nov. 13, 2018 (JP) .............................. JP2018-212743

(51) Int. Cl.
| | |
|---|---|
| D03D 15/00 | (2021.01) |
| D03D 19/00 | (2006.01) |
| D03D 11/00 | (2006.01) |
| D03D 25/00 | (2006.01) |
| D03D 1/00 | (2006.01) |
| B32B 5/02 | (2006.01) |
| F21V 8/00 | (2006.01) |

(Continued)

(52) U.S. Cl.
CPC ............. *D03D 15/00* (2013.01); *B32B 5/024* (2013.01); *B32B 5/26* (2013.01); *D03D 1/00* (2013.01); *D03D 1/0088* (2013.01); *D03D 11/00* (2013.01); *D03D 11/02* (2013.01); *D03D 19/00* (2013.01); *D03D 25/00* (2013.01); *G02B 6/001* (2013.01); *B32B 2551/00* (2013.01); *D10B 2401/20* (2013.01); *D10B 2505/08* (2013.01); *D10B 2505/12* (2013.01)

(58) Field of Classification Search
CPC ....................................................... D03D 15/00
See application file for complete search history.

(56) References Cited

U.S. PATENT DOCUMENTS

| | | | | | |
|---|---|---|---|---|---|
| 4,234,907 A | * | 11/1980 | Daniel | ................... | D02G 3/441 |
| | | | | | 362/556 |
| 4,885,663 A | * | 12/1989 | Parker | ................... | G02B 6/001 |
| | | | | | 362/561 |

(Continued)

FOREIGN PATENT DOCUMENTS

| | | |
|---|---|---|
| CN | 1948578 A | 4/2007 |
| EP | 1 307 687 A1 | 5/2003 |

(Continued)

OTHER PUBLICATIONS

Office Action of the corresponding EP application No. 18 212 969 dated May 8, 2019.

(Continued)

*Primary Examiner* — Andrew T Piziali
(74) *Attorney, Agent, or Firm* — Muncy, Geissler, Olds & Lowe, P.C.

(57) ABSTRACT

A woven fabric including: a first region where a first fiber as an optical fiber is woven with a second fiber as a non-optical fiber; a second region adjacent to the first region, in which the first fiber is not woven; and a third region adjacent to the second region, in which the first fiber is connected to a light source.

7 Claims, 13 Drawing Sheets

(51) Int. Cl.
*B32B 5/26* (2006.01)
*D03D 11/02* (2006.01)

(56) References Cited

U.S. PATENT DOCUMENTS

| | | | | |
|---|---|---|---|---|
| 4,907,132 A * | 3/1990 | Parker | ............... | G02B 6/0033 |
| | | | | 362/556 |
| 6,480,649 B2 * | 11/2002 | Lee | ............... | F21S 2/00 |
| | | | | 385/100 |
| 6,628,885 B1 * | 9/2003 | Wilkie | ............... | G02B 6/001 |
| | | | | 385/147 |
| 8,702,291 B2 * | 4/2014 | Stephan | ............... | A61N 5/0616 |
| | | | | 362/553 |
| 2003/0156426 A1 | 8/2003 | Givoletti | | |
| 2007/0281155 A1 * | 12/2007 | Tao | ............... | A47H 21/00 |
| | | | | 428/365 |
| 2017/0297484 A1 | 10/2017 | Yamada et al. | | |
| 2017/0342607 A1 | 11/2017 | Yamada et al. | | |
| 2017/0342608 A1 | 11/2017 | Yamada et al. | | |
| 2017/0343736 A1 | 11/2017 | Yamada et al. | | |
| 2018/0162268 A1 | 6/2018 | Yamada et al. | | |

FOREIGN PATENT DOCUMENTS

| | | |
|---|---|---|
| JP | 2007-169807 A | 7/2007 |
| JP | 2010-267573 A | 11/2010 |
| JP | 2016-037688 A | 3/2016 |

OTHER PUBLICATIONS

The European search report of 18 212 969 dated Apr. 25, 2019.
Office Action of the corresponding CN application No. 201811538783.3 dated Feb. 1, 2021 and partial English translation thereof.

* cited by examiner

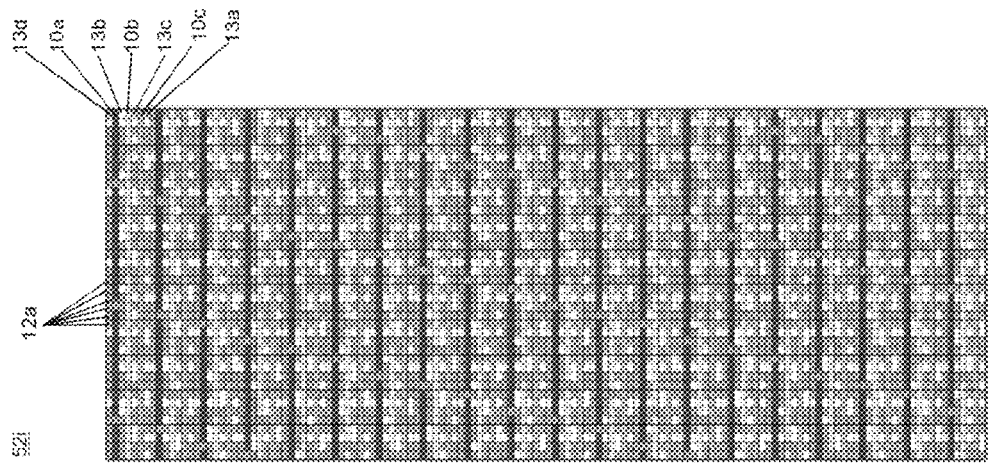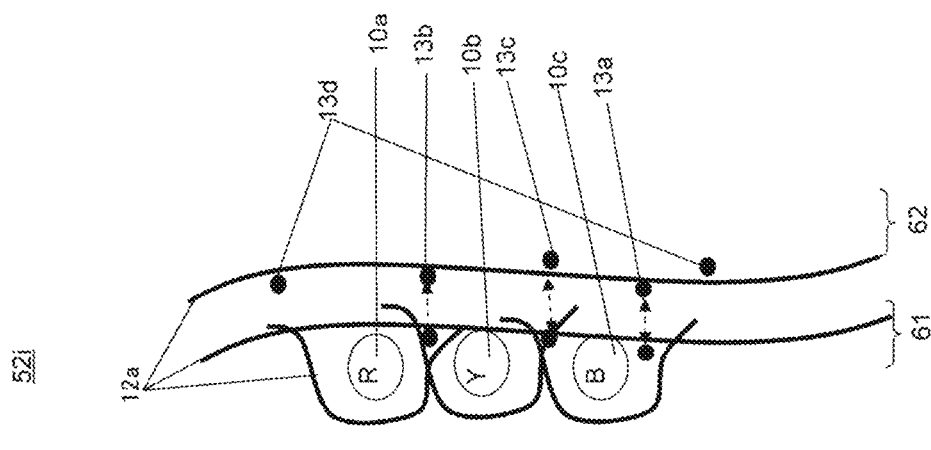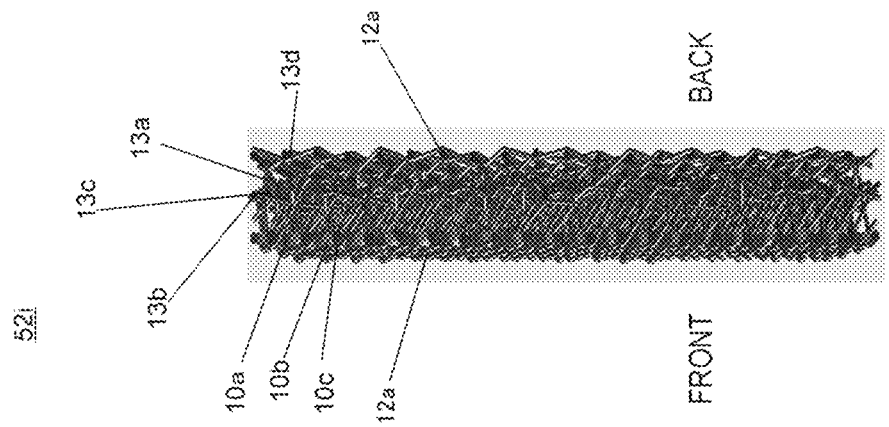

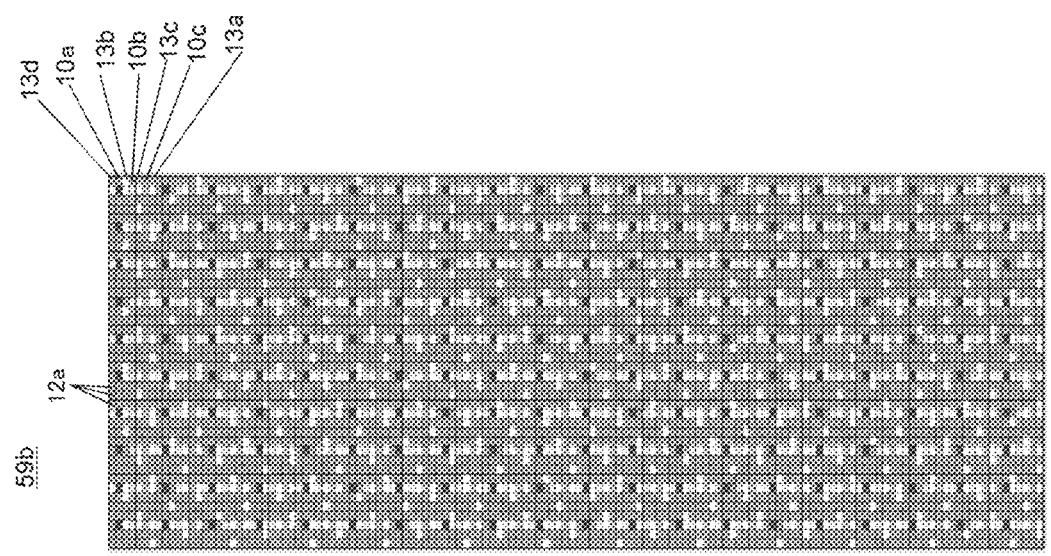
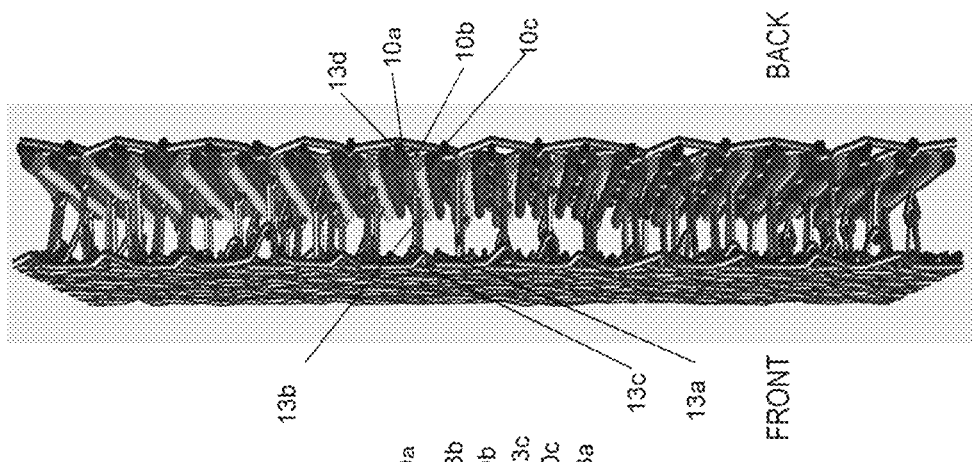

WOVEN FABRIC

FIELD OF THE INVENTION

The present disclosure relates to a woven fabric, and particularly to a woven fabric in which an optical fiber is put in a part of the woven fabric.

BACKGROUND OF THE INVENTION

A woven fabric in which an optical fiber is embedded in a part of the woven fabric has been taken into consideration in the related art. For example, Patent Document 1 discloses a woven fabric in which an optical fiber is embedded in a part of the woven fabric. The optical fiber is connected to a light source, and light is emitted from the optical fiber. As a result, the woven fabric becomes a vivid woven fabric.

See, for example, Japanese Patent Laid-Open Publication No. 2010-267573.

SUMMARY OF THE INVENTION

In the woven fabric of Patent Document 1, a method of connecting the optical fiber to the light source is not disclosed. It is unclear how to extract the optical fiber from the woven fabric, and connect the optical fiber to the light source.

The present disclosure has been made in view of these problems, and an object thereof is to provide an optical fiber woven fabric and a manufacturing method thereof, in which optical fibers may be easily extracted from the optical fiber woven fabric, and various types of light sources in various colors are freely combined according to a designated type or a coloration in a designated region, so that various types of complicated light emissions in various colors may be expressed.

In order to solve the above problems, there is provided a woven fabric including: a first region where a first fiber as an optical fiber is woven with a second fiber as a non-optical fiber; a second region adjacent to the first region, in which the first fiber is not woven; and a third region adjacent to the second region, in which the first fiber is connected to a light source.

According to the present disclosure, the position of the optical fiber may be fixed within the woven fabric.

BRIEF DESCRIPTION OF THE DRAWINGS

FIG. 9A is a side perspective view of a three-color emitting region 52i in the sixth exemplary embodiment, FIG. 9B is a schematic side view of the three-color emitting region 52i in the sixth exemplary embodiment, and FIG. 9C is a schematic plan view of the three-color emitting region 52i of the woven fabric 600 in the sixth exemplary embodiment;

FIG. 11A is a plan view of a ninth region 59b in the sixth exemplary embodiment, FIG. 11B is a schematic side view of the ninth region 59b in the sixth exemplary embodiment, and FIG. 11C is a side perspective view of the ninth region 59b in the sixth exemplary embodiment;

DETAILED DESCRIPTION OF THE INVENTION

The present disclosure will be described by the following exemplary embodiments. The following exemplary embodiments are exemplary only and do not limit the present disclosure.

First Exemplary Embodiment

Figure 1A:
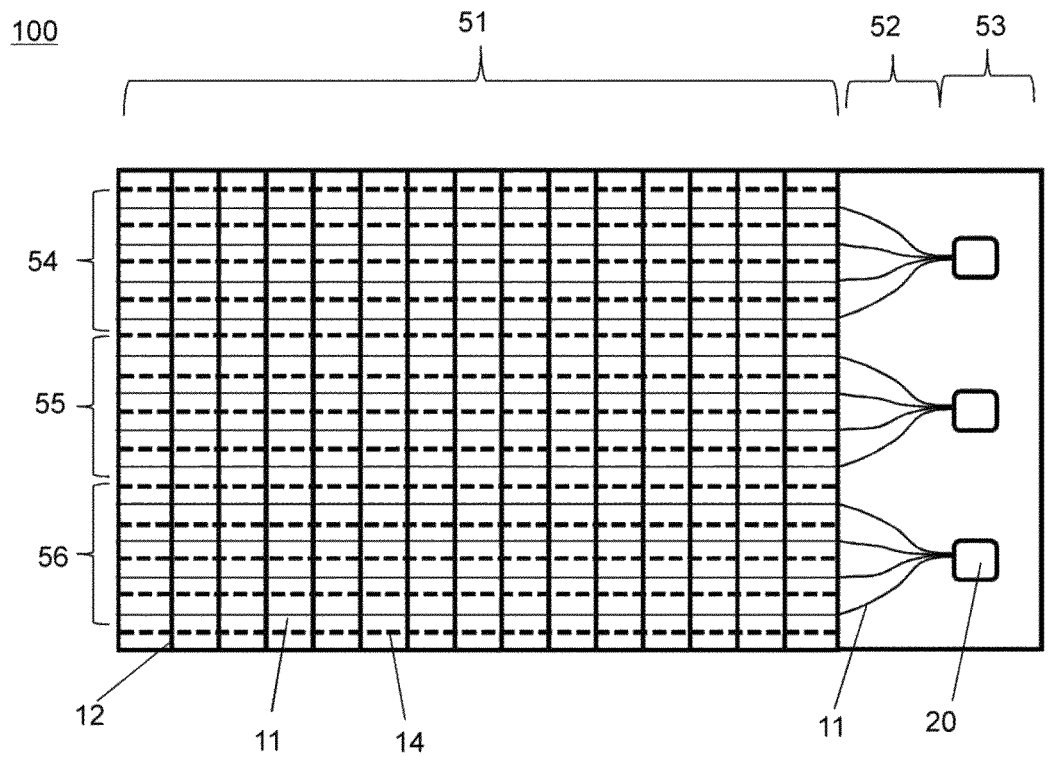
FIG. 1A is a plan view of a woven fabric 100 according to a first exemplary embodiment.
Figure 1B:
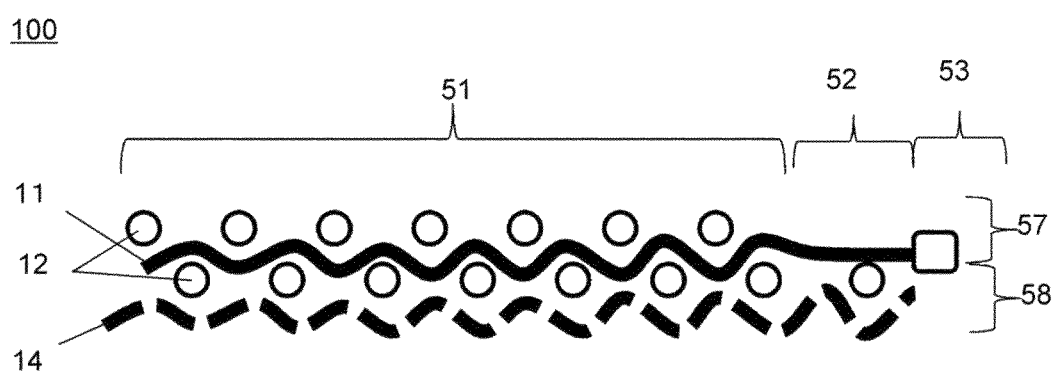
FIG. 1B is a cross-sectional view in a direction parallel to a first fiber 11 of the woven fabric 100.
Figure 1C:
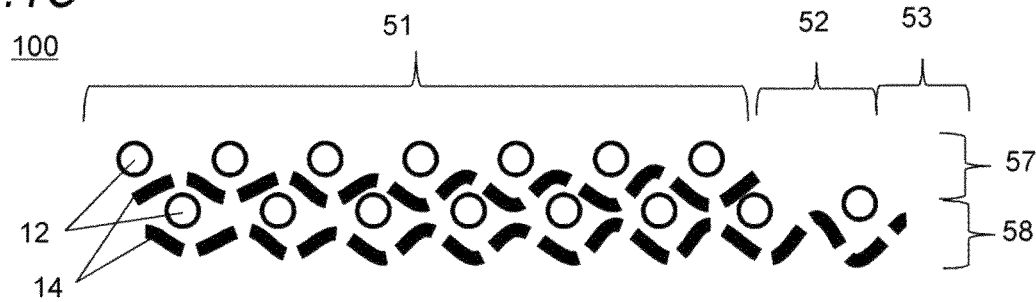
FIG. 1C is a cross-sectional view of the woven fabric 100 in an enlarged scale.

FIG. 1A is a plan view of a woven fabric 100 according to a first exemplary embodiment. FIG. 1B is a cross-sectional view of a portion of the woven fabric 100 according to the first exemplary embodiment in which a first fiber 11 is present on a front portion. FIG. 1C is a cross-sectional view of a portion of the woven fabric 100 according to the first exemplary embodiment in which a fourth fiber 14 is present on a rear portion.

The woven fabric 100 has a first region 51 to a sixth region 56.

In the first region 51, the first fiber 11, the fourth fiber 14, and a second fiber 12 are woven as wefts and warps.

The second region 52 is a region where the first fiber 11 is present alone. It is desirable that the first fiber 11 is not fixed. The portion of the second region 52 may be folded back so that the woven fabric 100 may be mounted in, for example, an automobile. It is desirable that another fiber, such as the fourth fiber 14, is present for protection in the upper layer of the first fiber 11.

The third region 53 is a region where the first fiber 11 is connected to a light source 20. The first fiber 11 has a margin (degree of freedom) in the portion of the second region 52.

The fourth region 54, the fifth region 55, and the sixth region 56 are partitioned regions for the light sources 20, respectively.

A seventh region 57 is a front surface layer of the woven fabric 100.

An eighth region 58 is a back surface layer or an internal layer of the woven fabric 100.

Here, the first fiber 11 is an optical fiber. It is desirable that the optical fiber is made of a resin from the viewpoint of a weaving property. Specifically, for example, (1) an optical fiber in which a core and a clad which do not allow total reflection but are correlated with a refractive index are combined, or (2) an optical fiber in which a core material is blended with a light scattering material may be used.

That is, the above (1) is a side emission-type optical fiber using a phenomenon in which light guided inside the core is not totally reflected between the core and the clad, and leaks. Meanwhile, the above (2) is a side emission-type optical fiber that has a structure in which light is not totally reflected at an interface between a core and a clad due to blending with the scattering material, and scattered light leaks from the side surface of the optical fiber.

In such an optical fiber, it is possible to control the side surface emission luminance by adjusting the concentration of the light scattering material blended with the core material. Further, a side emission-type optical fiber having a configuration other than these may be employed. As these side emission-type optical fibers, only one type may be used, or two or more types may be used in combination.

The diameter of the optical fiber is not particularly limited, but, from the viewpoint of suitably obtaining a weaving property, for example, the diameter may be 0.01 mm or more and 2.0 mm or less, preferably may be 0.05 mm or more and 1.5 mm or less, and more preferably 0.1 mm or more and 1.0 mm or less.

It is not necessary that all the first fibers 11 are optical fibers. The ratio is not limited, but is generally 10% or more, preferably 10% or more and 90% or less, more preferably 20% or more and 80% or less, and most preferably 30% or more and 70% or less.

A part of the first fibers 11 may be the following non-light guiding yarns. Optical fibers in the following exemplary embodiments are also the same as those described above.

The second fiber 12 and the fourth fiber 14 are non-conductive fibers, and are non-light guiding yarns, which are yarns not having a light guiding property unlike the optical fiber. Materials constituting the second fiber 12 and the fourth fiber 14 are not limited, and may be natural fibers or synthetic fibers. In the case of a synthetic fiber, as the constituent resins, a polyamide-based resin such as nylon 6 and nylon 66, a polyester-based resin such as polyethyleneterephthalate, polybutyleneterephthalate, and polytrimethyleneterephthalate, a polyolefin-based resin such as polypropylene, and a polyacryl-based resin may be exemplified. As these, only one type may be used, or two or more types may be used in combination.

The fineness of the second fiber 12 and the fourth fiber 14 is not particularly limited, but may be, for example, 10 dtex or more and 5,000 dtex or less, preferably 20 dtex or more and 4,000 dtex or less, and more preferably 30 dtex or more and 3,000 dtex or less.

Meanwhile, it is more desirable that the fineness (diameter) of the optical fiber of the first fiber 11 is smaller than the fourth fiber 14.

Each of the second fiber 12 and the fourth fiber 14 may not include a light transmission inhibiting component, or may include a light transmission inhibiting component. When each of the second fiber 12 and the fourth fiber 14 includes a light transmission inhibiting component, it is possible to improve a light shielding property against the optical fiber.

The light transmission inhibiting component only has to be a component capable of inhibiting light transmission, and may inhibit light transmission by, for example, reflection•dispersion, light absorption, or other actions. Specifically, a colorant (e.g., a pigment or a dye), a light absorbent, and an extender (e.g., various fillers) may be exemplified. As these, only one type may be used, or two or more types may be used in combination. Among them, for example, as the pigment, an organic pigment such as azo-based, phthalocyanine-based, perinone-based, perylene-based, and anthraquinone-based pigments, and an inorganic pigment such as carbon black, ultramarine, red iron oxide, titanium oxide, and iron oxide may be exemplified. As these, only one type may be used, or two or more types may be used in combination. As the dye, a dye such as anthraquinone-based, perinone-based, perylene-based, azo-based, methine-based, and quinoline-based dyes may be exemplified. Among them, a dye in darker color is desirable, and a black-based dye is particularly desirable. As these, only one type may be used, or two or more types may be used in combination.

In the following exemplary embodiments, fibers other than an optical fiber are the same as the above-described fibers other than the optical fiber.

The light source 20 is a light source such as an LED. Here, in FIG. 1A, three LEDs may be used. When the three LEDs have three primary colors of red, green, and blue, the fourth region 54, the fifth region 55, and the sixth region 56 have different colors, respectively, so that the woven fabric 100 becomes colorful.

Each of the light sources 20 is connected to a power supply and a controller (a semiconductor device), and individually controlled.

Second Exemplary Embodiment

Figure 2:
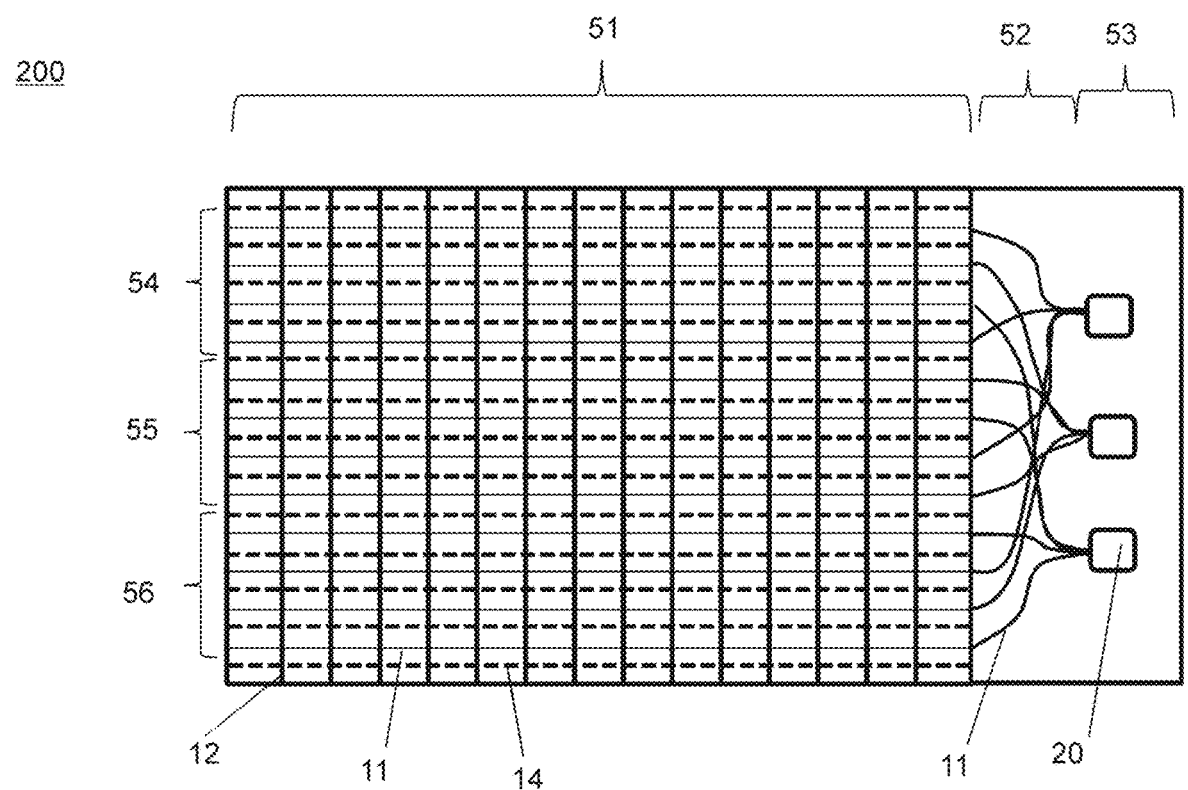
FIG. 2 is a plan view of a woven fabric 200 according to a second exemplary embodiment.

FIG. 2 is a plan view for explaining a woven fabric 200 as a modification of the woven fabric 100.

FIG. 2 is a view corresponding to FIG. 1A. This is different from FIG. 1A in a connection relationship with the first fiber 11 (an optical fiber) in the second region 52. Items not described are the same as those in the first exemplary embodiment.

In the woven fabric 200, a connection between the optical fibers as the first fibers 11 and the light sources 20 is different from that in the first exemplary embodiment. In the woven fabric 200, the combination of an arrangement order of the first fibers 11 and the light sources 20 to be connected is different from that in the woven fabric 100. In this case, the first fibers 11 are alternately connected to the three types of light sources 20, respectively, in the arrangement order.

As a result, it is possible to express fine colors as compared to the first exemplary embodiment.

Third Exemplary Embodiment

Figure 3A:
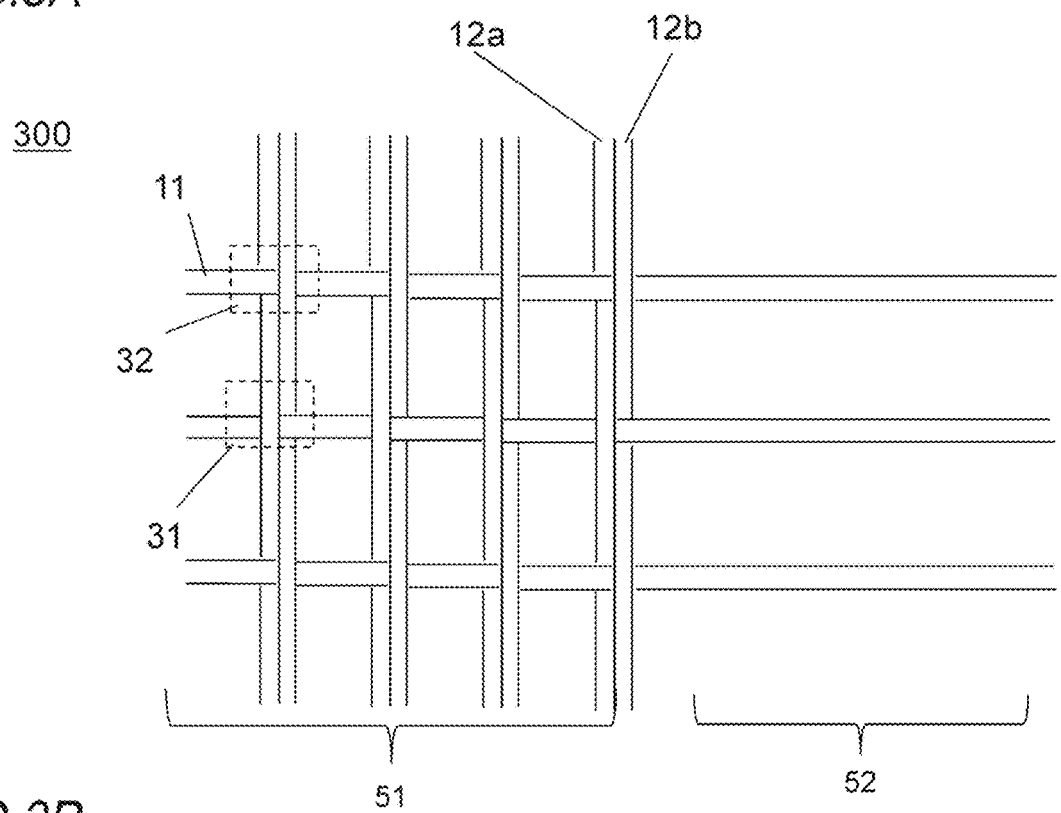
FIG. 3A is a plan view of a woven fabric 300 according to a third exemplary embodiment.
Figure 3B:
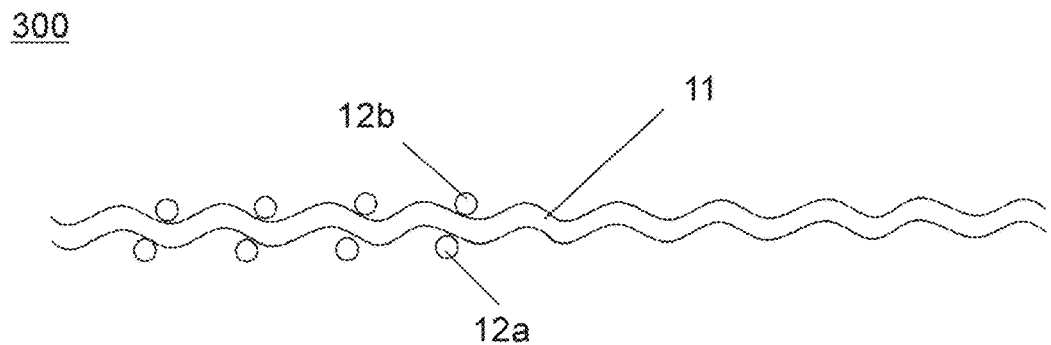
FIG. 3B is a cross-sectional view in a direction parallel to a first fiber 11 of the woven fabric 300.
Figure 3C:
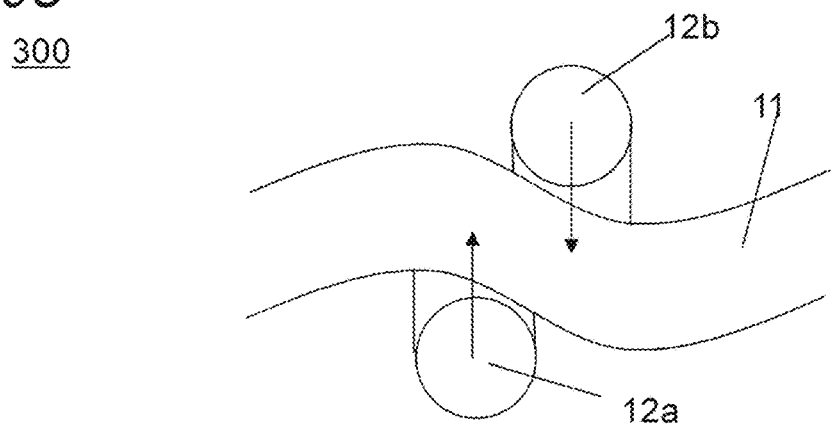
FIG. 3C is a cross-sectional view of the woven fabric 300 in an enlarged scale.

FIGS. 3A to 3C are plan views for explaining a woven fabric 300 as a modification of the woven fabric 100.

FIG. 3A is a plan view of the woven fabric 300 in an enlarged scale. FIG. 3B is a cross-sectional view of the woven fabric 300. FIG. 3C is a cross-sectional view of the woven fabric 300 in an enlarged scale.

The first region 51 of the woven fabric 300 according to the third exemplary embodiment is different from that in the above exemplary embodiments. Others are the same as in the first and second exemplary embodiments, and therefore, are omitted.

The first fiber 11 is a weft, and is an optical fiber. Second fibers 12a and 12b are warps, and fibers other than an optical fiber.

The first fiber 11 intersects with the second fibers 12a and 12b. The second fiber 12a passes through a front portion of the first fiber 11 at a first intersection 31, and then passes through a rear portion of the first fiber 11 at a following second intersection 32. Contrary to the second fiber 12a, the second fiber 12b passes through each of a rear portion and a front portion of the first fiber 11 at the intersections. The second fiber 12a is contrary to the second fiber 12b, in passing through each of the front portion and the rear portion as described above at each intersection.

The optical fiber of the first fiber 11 is fixed by opposite forces applied by the second fibers 12a and 12b from the upper and lower sides in a vertical direction. The position of the optical fiber may be fixed within the woven fabric 300.

Fourth Exemplary Embodiment

Figure 4A:
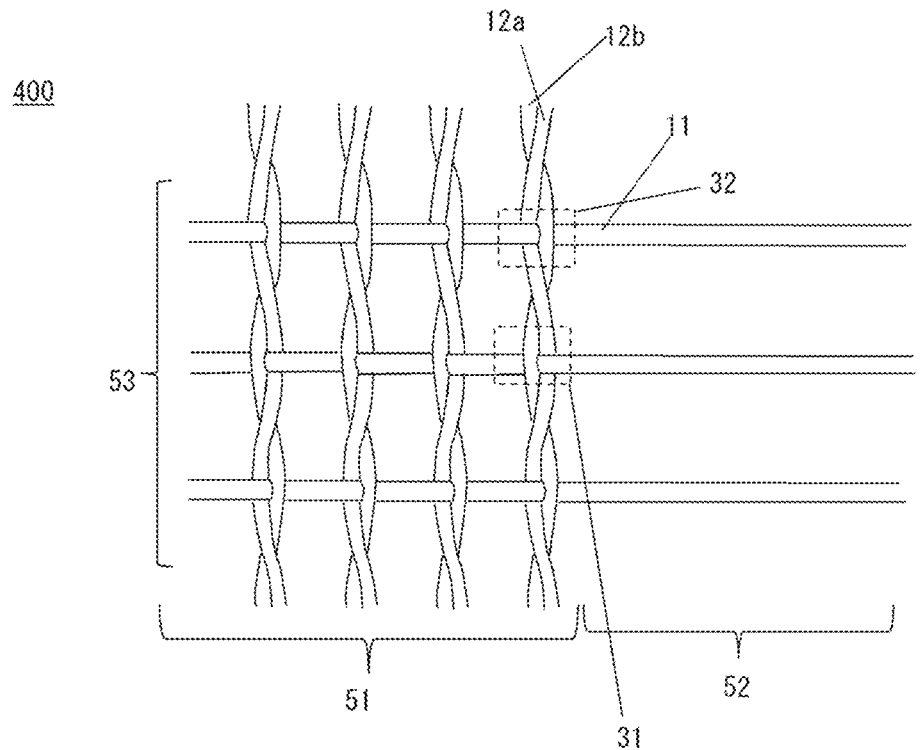
FIG. 4A is a plan view of a woven fabric 400 according to a fourth exemplary embodiment.
Figure 4B:
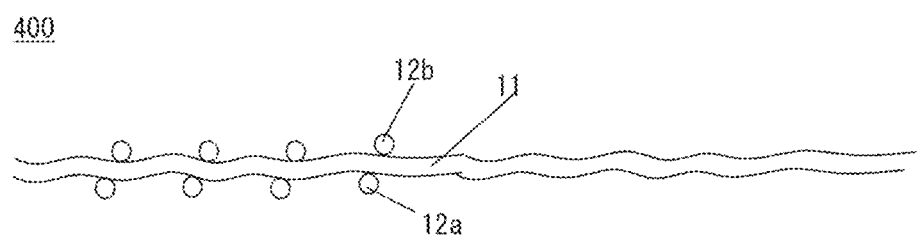
FIG. 4B is a cross-sectional view in a direction parallel to a first fiber 11 of the woven fabric 400.
Figure 4C:
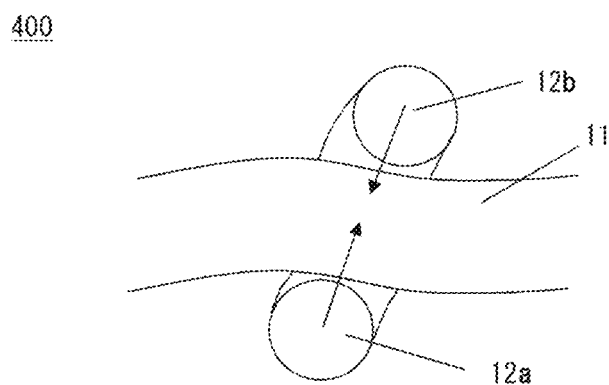
FIG. 4C is a cross-sectional view of the woven fabric 400 in an enlarged scale.

FIGS. 4A to 4C are plan views for explaining a woven fabric 400 as a modification of the woven fabric 100.

FIG. 4A is a plan view of the woven fabric 400 according to the fourth exemplary embodiment. The woven fabric 400 includes the first fiber 11 and the second fibers 12a and 12b. Items not described are the same as those in the first to third exemplary embodiments. This exemplary embodiment is different from the above exemplary embodiments in the first region 51.

The first fiber 11 is an optical fiber. The second fibers 12a and 12b are fibers other than an optical fiber. The first fiber 11 and the second fibers 12a and 12b may have a warp-weft relationship.

The first fiber 11 intersects with the second fibers 12a and 12b. Each of the second fibers 12a and 12b passes through each of a rear portion and a front portion of the first fiber 11, at the first intersection 31. Thereafter, between the first intersection 31 and the following second intersection 32, left and right positions of both are switched. Then, each of the second fibers 12a and 12b passes through each of a rear portion and a front portion at the second intersection 32.

FIG. 4B is a cross-sectional view of the woven fabric 400 in a direction parallel to the first fiber 11. FIG. 4C is a cross-sectional view of the woven fabric 400 in an enlarged scale.

To the optical fiber of the first fiber 11, forces are obliquely applied by the second fibers 12a and 12b from the upper and lower sides. The directions of the forces match each other. As a result, as compared to FIGS. 3A to 3C, bending of the optical fiber is small. The optical fiber is not largely bent, and thus is good in a light guiding property, and uniformly emits light.

The weaving method in FIGS. 4A to 4C is a leno weave.

Fifth Exemplary Embodiment

Figure 5:
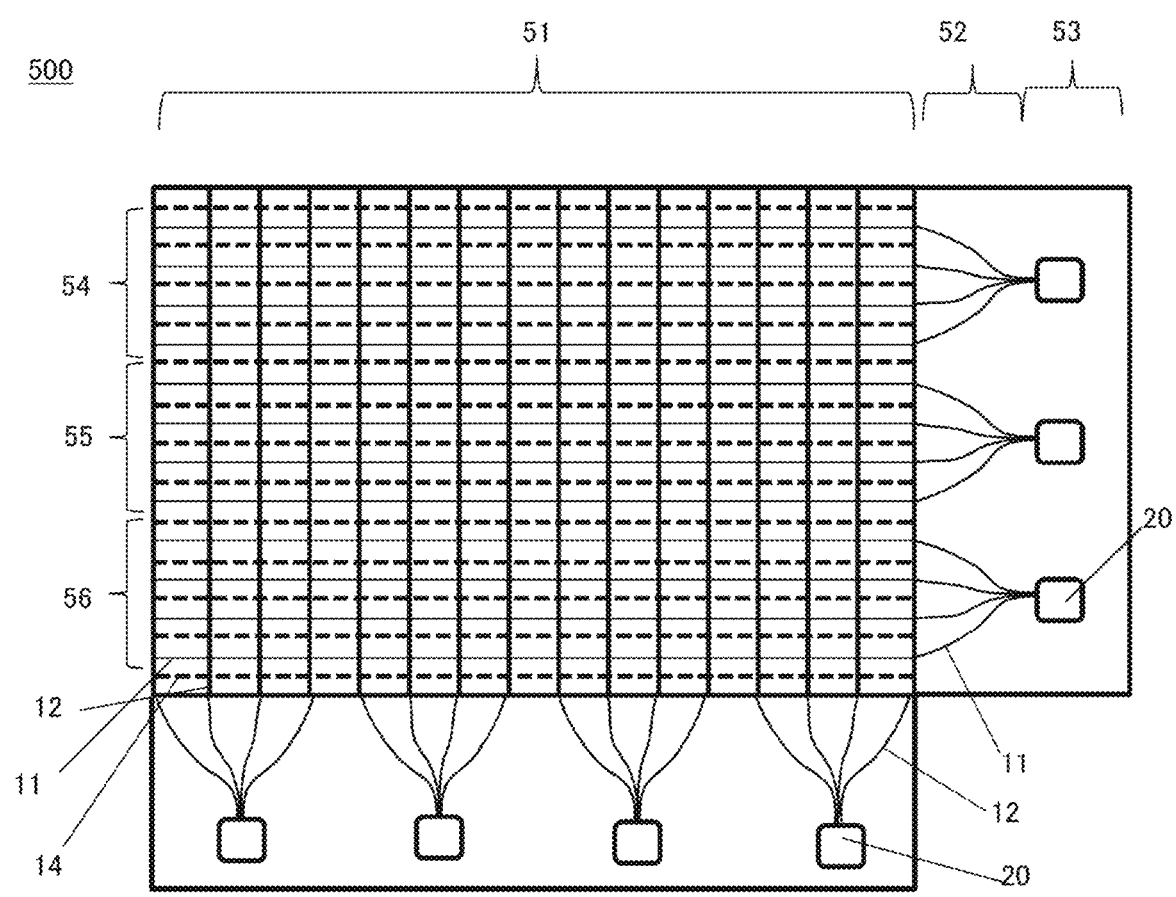
FIG. 5 is a plan view of a woven fabric 500 according to a fifth exemplary embodiment.

FIG. 5 is a plan view of a woven fabric 500 according to a fifth exemplary embodiment. FIG. 5 is a plan view of the woven fabric 500 as a modification of the woven fabric 100 in FIG. 1A. Items not described are the same as those in the above exemplary embodiments.

In FIG. 5, unlike in FIG. 1A, the second fiber 12 also uses an optical fiber. Items not described are the same as those in the above exemplary embodiments. Although not illustrated, at the lower side as well, there are the second region 52 and the third region 53. Likewise, although not illustrated, in the left-right directions as well, there are the fourth region 54, the fifth region 55, and the sixth region 56.

In the woven fabric 500, it is possible to emit light in the vertical-horizontal directions. It is possible to express optical images in various colors.

Sixth Exemplary Embodiment

Figure 6:
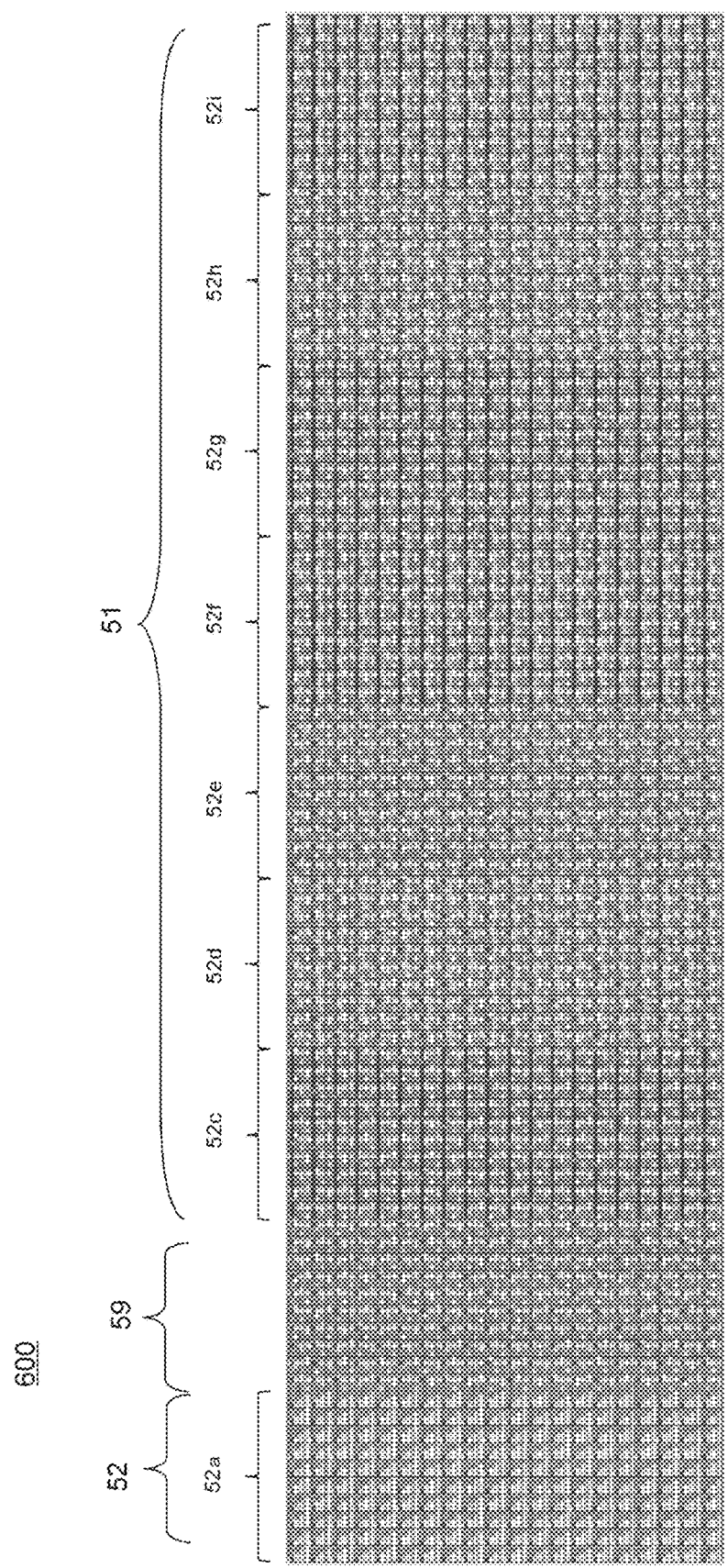
FIG. 6 is a plan view of a woven fabric 600 according to a sixth exemplary embodiment.

FIG. 6 is a plan view of a woven fabric 600 according to a sixth exemplary embodiment. FIG. 6 is a schematic plan view of the woven fabric 600.

In FIG. 6, fibers visible from above are described in units of cells (square unit mass).

Figure 7:
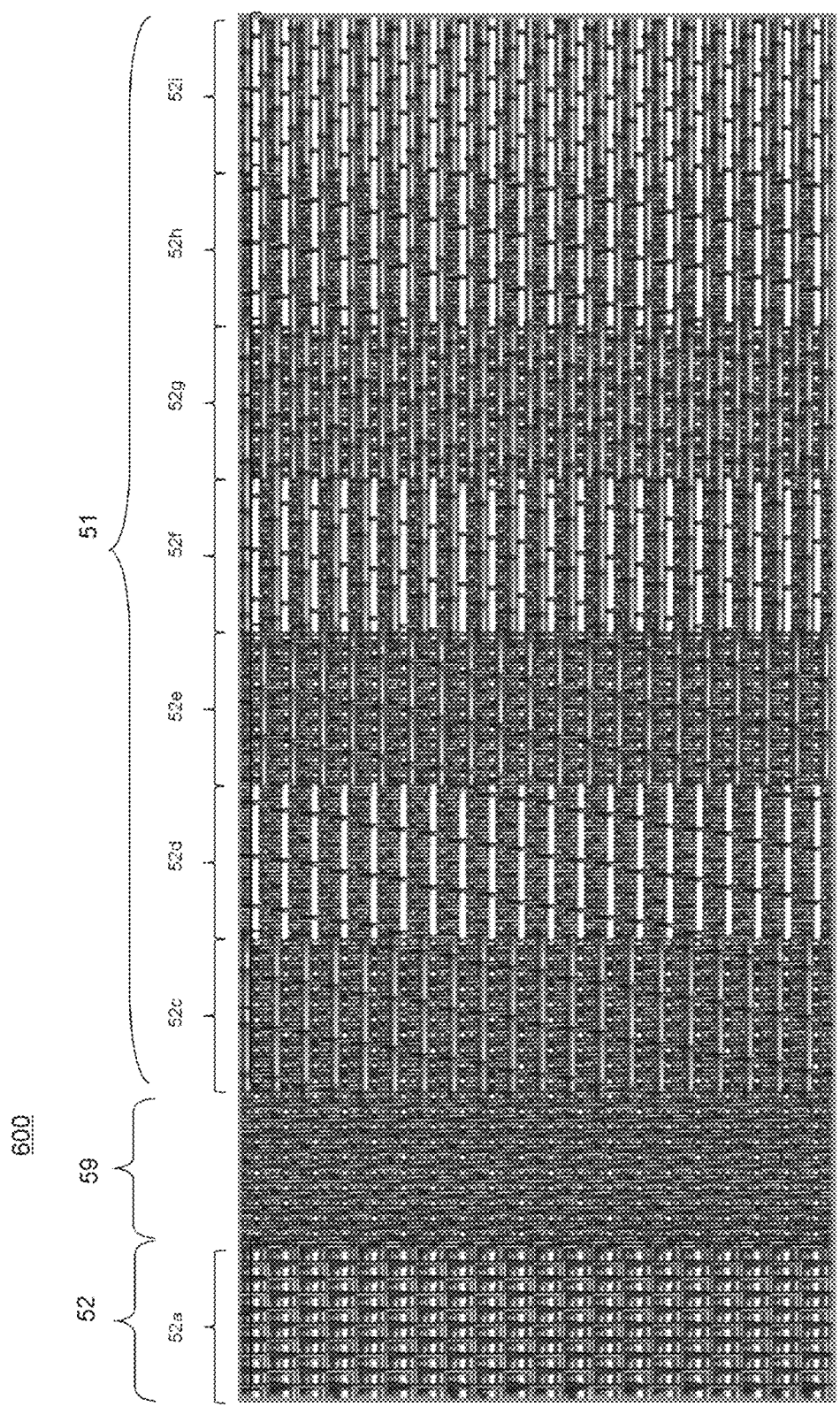
FIG. 7 is a plan view of the woven fabric 600 according to the sixth exemplary embodiment.

FIG. 7 is a plan view of the woven fabric 600. FIG. 7 stereoscopically represents fibers visible from above. Items not described are the same as those in the above exemplary embodiments.

The first region 51, the second region 52, and a ninth region 59 are included. The third region 53 is not illustrated, but it is desirable to provide the third region 53.

The first region 51 is a region where an optical fiber emits light to the front surface.

The second region 52 includes a bag region 52a. This is a region where the first fiber 11 is not woven with another fiber but is present alone. It is desirable that the first fiber 11 is not fixed by another fiber. This region is a region through which the optical fiber is connected to the light source 20 such as an LED in the third region 53 (not illustrated, FIGS. 1A to 1C) connected to this region.

The ninth region 59 is a region where the optical fiber is fixed in a state of being almost invisible from the front surface. The position of the optical fiber is kept within the woven fabric 600.

In the woven fabric 600, there are the bag region 52a of the second region 52, the ninth region 59, the first region 51, a red emitting region 52c, a yellow emitting region 52d, a blue emitting region 52e, a red/yellow emitting region 52f, a red/blue emitting region 52g, a yellow/blue emitting region 52h, and a three-color emitting region 52i. The third region 53 in the first exemplary embodiment (a region where the light source 20 is connected to a fiber) is omitted. It is not necessary to provide all regions. At least one region of the bag region 52a of the second region 52, the ninth region 59, and the first region 51 suffices.

The bag region 52a corresponds to the second region 52 in the first exemplary embodiment, where the fibers of the optical fibers are separated from other fibers. In this region, the light source 20 is connected to the optical fiber.

The red emitting region 52c to the three-color emitting region 52i are regions where light is emitted. These regions emit light in red, yellow, blue, red/yellow, red/blue, yellow/blue, and three colors, respectively.

The ninth region 59 is a fixing region where the optical fiber is fixed in a state of being almost invisible from the front surface. The ninth region 59 (the fixing region) may be provided in woven fabrics according to other exemplary embodiments.

<Bag Region 52a>

Figure 8B:
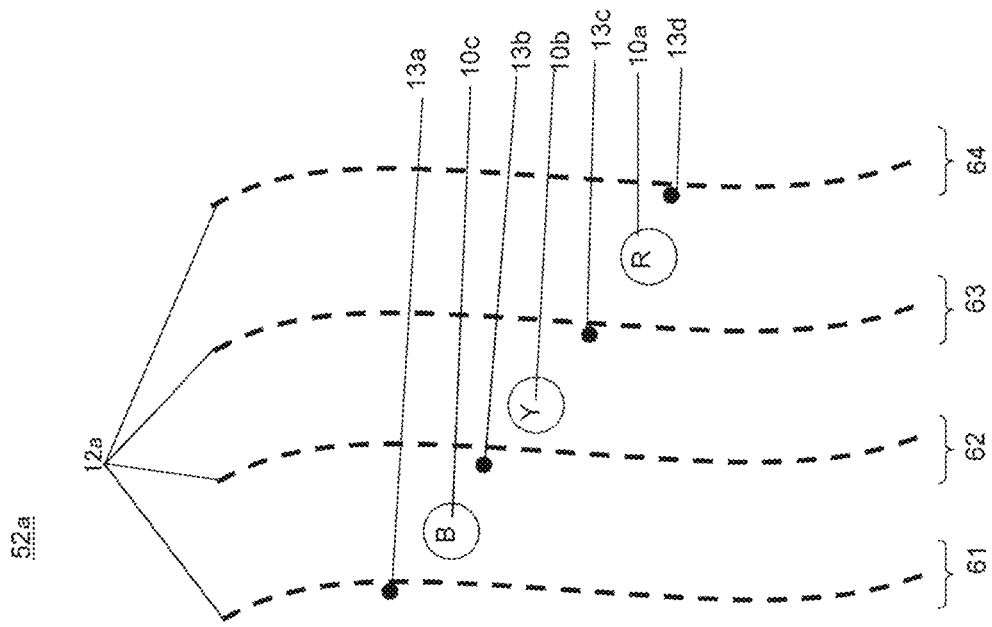
FIG. 8B is a schematic side view of the bag region 52a in the sixth exemplary embodiment.
Figure 8A:
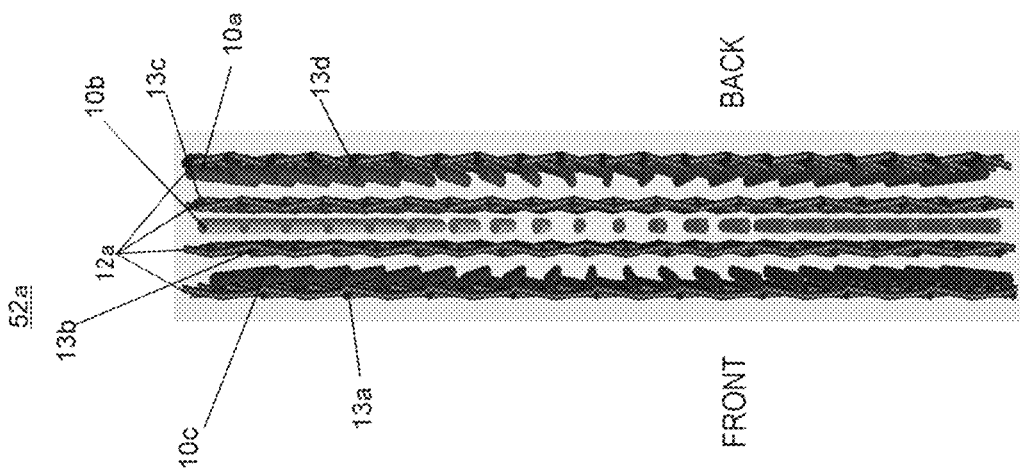
FIG. 8A is a side perspective view of a bag region 52a in the sixth exemplary embodiment.

FIG. 8A is a side perspective view of the bag region 52a. FIG. 8B is a schematic side view of the bag region 52a.

The second fiber 12a as a warp and a third fiber 13a as a weft form a first layer 61, the second fiber 12a as a warp and a third fiber 13b as a weft form a second layer 62, the second fiber 12a as a warp and a third fiber 13c as a weft form a third layer 63, and the second fiber 12a as a warp and a third fiber 13d as a weft form a fourth layer 64. A blue fiber 10c is arranged between the first and second layers, a yellow fiber 10b is arranged between the second and third layers, and a red fiber 10a is arranged between the third and fourth layers.

The red fiber 10a, the yellow fiber 10b, and the blue fiber 10c are optical fibers that emit lights of respective colors. Other fibers are fibers other than optical fibers. The light only has to have three colors of red, yellow and blue. Through the synthesis of three colors, various lights may be emitted.

In the bag region 52a, each of the red fiber 10a, the yellow fiber 10b, and the blue fiber 10c is not woven with another fiber, and thus is easily connected to the light source 20. Three fibers are classified into respective separate layers.

<Three-Color Emitting Region 52i>

FIG. 9A is a side perspective view of the three-color emitting region 52i. FIG. 9B is a schematic side view of the three-color emitting region 52i. On the left side of the drawing, the front surface is present. FIG. 9C is a schematic plan view of the three-color emitting region 52i.

There is the second layer 62 as a lower layer constituted by the third fiber 13d and the second fiber 12a. On the top of the second layer 62, there is the first layer 61 constituted by the second fiber 12a. Meanwhile, the first layer 61 and the second layer 62 are coupled with each other by the third fiber 13a, the third fiber 13b, and the third fiber 13c.

On the top of the first layer 61, the red fiber 10a, the yellow fiber 10b, and the blue fiber 10c are located. Each is coupled with the first layer 61 by the second fiber 12a.

Through this structure, the red fiber 10a, the yellow fiber 10b, and the blue fiber 10c are located on the front surface, and fixed by only the second fiber 12a. Thus, it is possible to emit much light.

The first layer 61 and the second layer 62 are coupled with each other by the third fibers 13a to 13c, thereby having a strength. The second layer 62 forms a solid foundation by the second fiber 12a and the third fiber 13d.

For the red fiber 10a, the yellow fiber 10b, and the blue fiber 10c, as can be seen from FIG. 9C, one second fiber 12a is located on the front portion, and 12 or 13 red fibers 10a, 12 or 13 yellow fibers 10b, and 12 or 13 blue fibers 10c are located on the front portion. This cycle is repeated. A large part of the red fiber 10a, the yellow fiber 10b, and the blue fiber 10c is located on the front surface side of the second fiber 12a to emit light.

The one second fiber 12a holds each of the red fiber 10a, the yellow fiber 10b, and the blue fiber 10c. In the cycle of the red fiber 10a, the yellow fiber 10b, and the blue fiber 10c on the front portion, the number of fibers is 12 or 13. When the number is shortened, a light emission ratio is reduced, and bending of fibers, that is, the red fiber 10a, the yellow fiber 10b, and the blue fiber 10c increases. Thus, a light guiding property deteriorates, and the light emission efficiency becomes not good. When the number on the front portion increases, fixing of the red fiber 10a, the yellow fiber 10b, and the blue fiber 10c to a woven fabric becomes unstable. As a result, an exposed portion of an optical fiber becomes long, which becomes susceptible to a damage from the outside.

One place where the second fiber 12a is located on the upper side is gradually shifted from each of the red fiber 10a, the yellow fiber 10b, and the blue fiber 10c, thereby improving the design property.

In the red emitting region 52c, the yellow emitting region 52d, the blue emitting region 52e, the red/yellow emitting region 52f, the red/blue emitting region 52g, and the yellow/blue emitting region 52h, an optical fiber emitting light is located on the front surface of the first layer 61 so as to be largely exposed on the front surface, and its front surface is covered with the second fiber 12a. Meanwhile, an optical fiber that does not need to emit light is located on the front surface of the second layer 62 and on the back surface of the first layer 61.

<Yellow/Blue Emitting Region 52h>

Figure 10A:
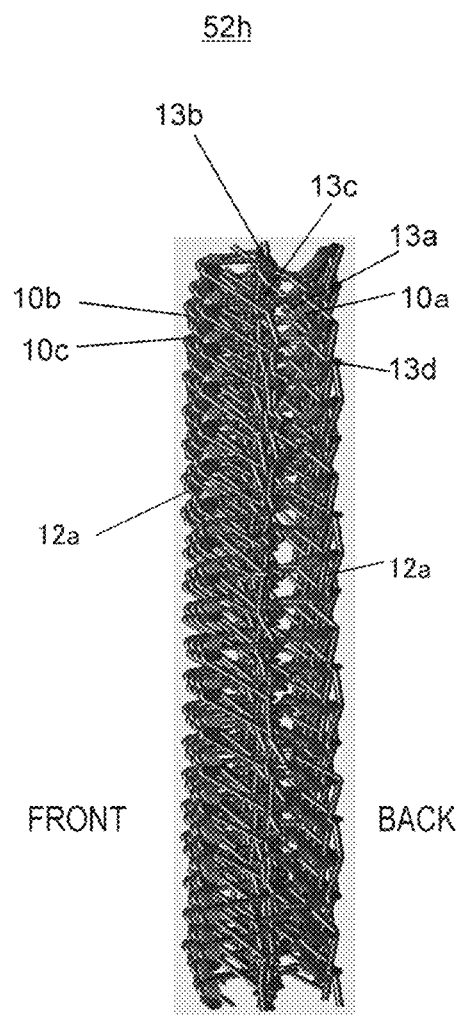
FIG. 10A is a side perspective view of a yellow/blue emitting region 52h in the sixth exemplary embodiment.
Figure 10B:
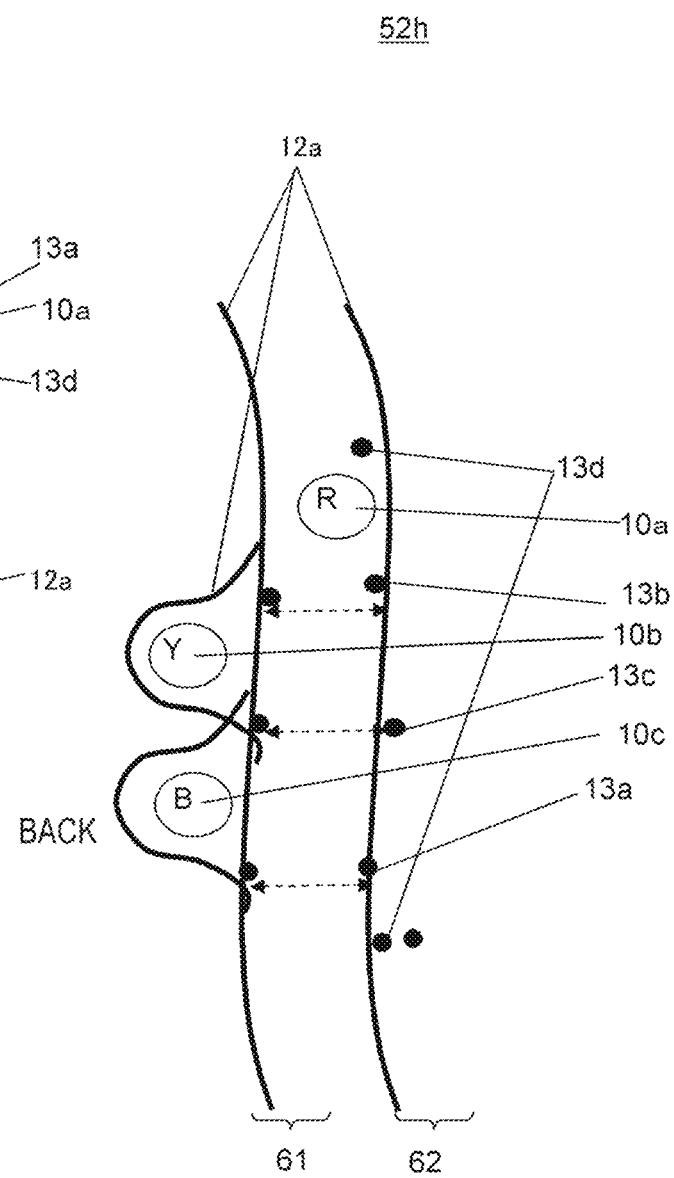
FIG. 10B is a schematic side view of the yellow/blue emitting region 52h in the sixth exemplary embodiment.

FIG. 10A is a side view of the yellow/blue emitting region 52h. FIG. 10B is a schematic side view of the yellow/blue emitting region 52h. On the left side of the drawing, the front surface is present.

There is the second layer 62 as a back layer constituted by the third fiber 13d and the second fiber 12a. On the top of the second layer 62, there is the first layer 61 constituted by the second fiber 12a. Meanwhile, the first layer 61 and the second layer 62 are coupled with each other by the third fiber 13a, the third fiber 13b, and the third fiber 13c.

On the top of the first layer 61, the yellow fiber 10b and the blue fiber 10c are located. Each is coupled with the first layer 61 by the second fiber 12a. The red fiber 10a is located between the first layer 61 and the second layer 62.

Through this structure, the yellow fiber 10b and the blue fiber 10c are located on the front surface, and fixed by only the second fiber 12a. Thus, it is possible to emit much light. The red fiber 10a is almost invisible from the front surface, and is reliably protected while its bending or compression is reduced between the first layer 61 and the second layer 62, and its light guiding property is maintained.

The first layer 61 and the second layer 62 are coupled with each other by the third fibers 13a to 13c, thereby having a strength. The second layer 62 forms a solid foundation by the second fiber 12a and the third fiber 13d.

<Ninth Region 59 (Fixing Region)>

FIG. 11A is a plan view of the ninth region 59 (the fixing region). FIG. 11B is a schematic side view of the ninth region 59 (the fixing region). FIG. 11C is a perspective view of a side surface of the ninth region 59.

The red fiber 10a, the yellow fiber 10b, and the blue fiber 10c are arranged between the four third fibers 13a to 13d. There is the second fiber 12a as a warp.

In the ninth region 59 (the fixing region), the red fiber 10a, the yellow fiber 10b, and the blue fiber 10c have the same cycles at which one is exposed on the front portion of the second fiber 12a and three are located on the rear portion. When the number is smaller than three, bending of the red fiber 10a, the yellow fiber 10b, and the blue fiber 10c increases, and thus the light emission efficiency deteriorates. When the number is larger than three, fixability of the red fiber 10a, the yellow fiber 10b, and the blue fiber 10c becomes bad. It is desirable that the number ranges from three to five.

<Entire Sixth Exemplary Embodiment>

It is possible to form the second region 52 (FIG. 8B), the ninth region 59b (FIG. 11B), and the first region 51 (FIG. 9B, and FIG. 10B) by arranging the red fiber 10a, the yellow fiber 10b, and the blue fiber 10c as optical fibers between the four third fibers 13a to 13d, and changing each position in the thickness direction. It is desirable that one fiber among the third fibers 13a to 13d has a larger diameter than other fibers. Accordingly, it is possible to secure the strength and flexibility of the woven fabric 600.

By configuring the light emitting region in two layers, the bag region 52a in four layers, and the fixing region in one layer, it is possible to sufficiently emit light while firmly holding the red fiber 10a, the yellow fiber 10b, and the blue fiber 10c. Then, a woven fabric with an overall strength is obtained.

<Effect>

The woven fabric 600 can emit light in various colors, by three colors. In the ninth region 59 (the fixing region), the optical fiber can be fixed while its bending or compression is reduced, and its light guiding property is maintained.

Seventh Exemplary Embodiment

Figure 12A:
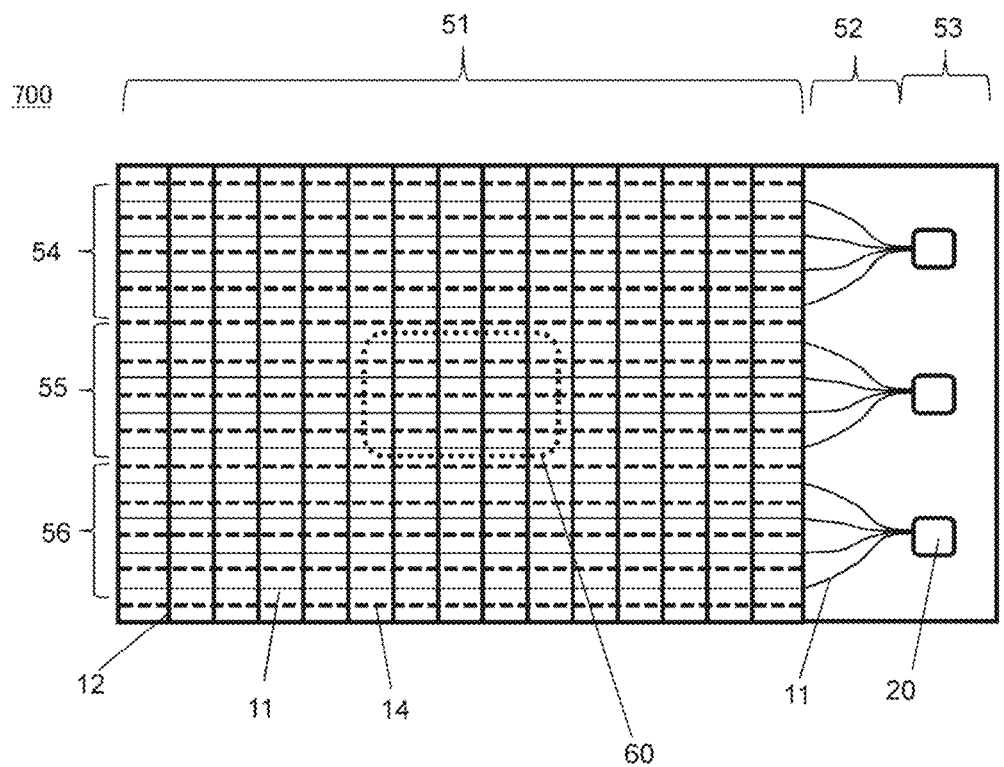
FIGS. 12A and 12B are plan views of a woven fabric 700 in a seventh exemplary embodiment.
Figure 12B:
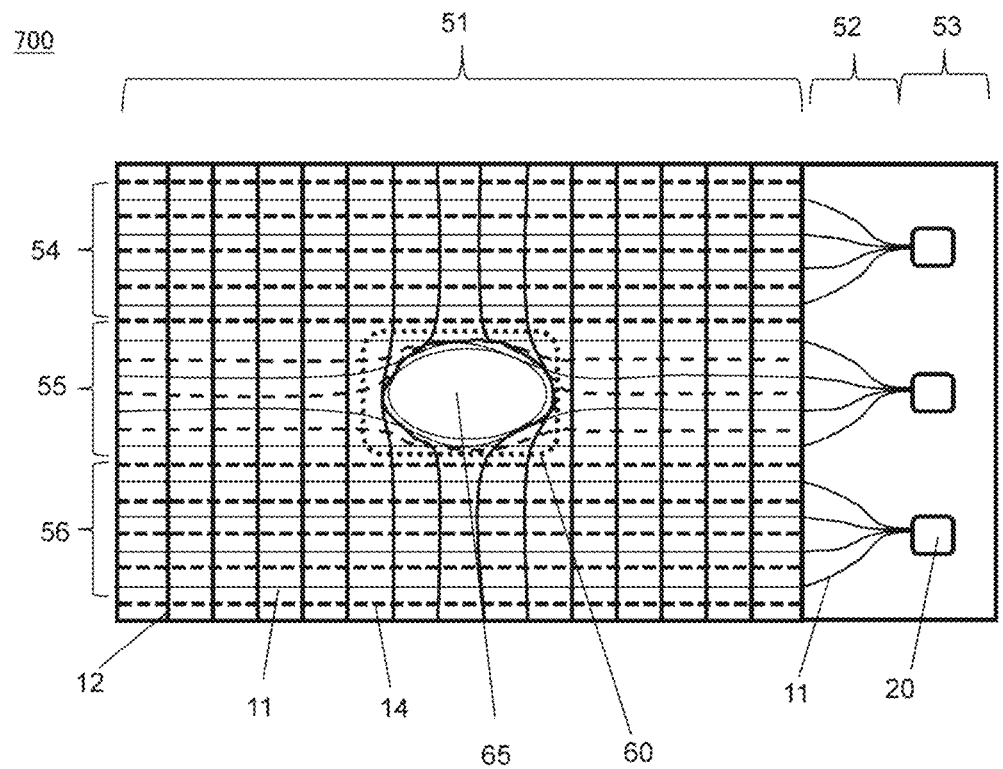

FIGS. 12A and 12B are plan views for explaining a woven fabric 700 as a modification of the woven fabric 100. Items not described are the same as those in the above exemplary embodiments.

In FIG. 12A, in the woven fabric 700, a tenth region 60 is located within the first region 51. Like the second region 52, the tenth region 60 is a region below. The first fiber 11 which is an optical fiber is positioned between the fourth fiber 14 and the second fiber 12 of the surface layer and the fourth fiber 14 of the back layer and the second fiber 12 in a state of being woven in a bag shape. And, the first fibers 11 are not woven by other fibers but exist alone. It is desirable that the first fiber 11 is not fixed. It is preferable that another fiber, the fourth fiber 14, and the like exist for protection in the surface layer and the upper layer of the first fiber 11.

FIG. 12B is a plan view in which the woven fabric 700 of FIG. 12A is arranged on a surface having an obstacle 65 for attaching and connecting various kinds of parts and the like. At this time, the fourth fiber 14 and the second fiber 12 of the woven fabric 700 of the surface layer which is the fiber other than the first fiber 11 are cut off. In other words, it is to remove the woven fabric 60 a of the surface layer other than the first fibers 11 in the tenth region. Since the first fiber 11 and the fourth fiber 14 and the second fiber 12 of the woven fabric 700 of the surface layer and the back layer are not woven, they can be easily removed. As a result, in the tenth region 60, since the first fiber 11, which is an optical fiber, is not woven by other fibers, it moves up and down, and obstacles 65 can be avoided. Without the tenth region 60, the first fiber 11, which is an optical fiber, is cut or pressed, so that light is not easily transmitted.

A part of the fourth fiber 14 and the second fiber 12 which are fibers other than the first fiber 11 in the tenth region 60 may be left.

The tenth region 60 may be located at an arbitrary place of the first region 51 or may be located in the vicinity or the outer peripheral portion of the first region 51, and a plurality of tenth regions 60 may be present. Here, the outer peripheral portion is a region including a part of the outer peripheral side of the first region 51. In this case, at least one side of the outer periphery of the tenth region 60 is not surrounded by the first region 51. It is desirable that the tenth region 60 is designed to have a similar shape corresponding to the shape of the obstacle 65.

Figure 13:
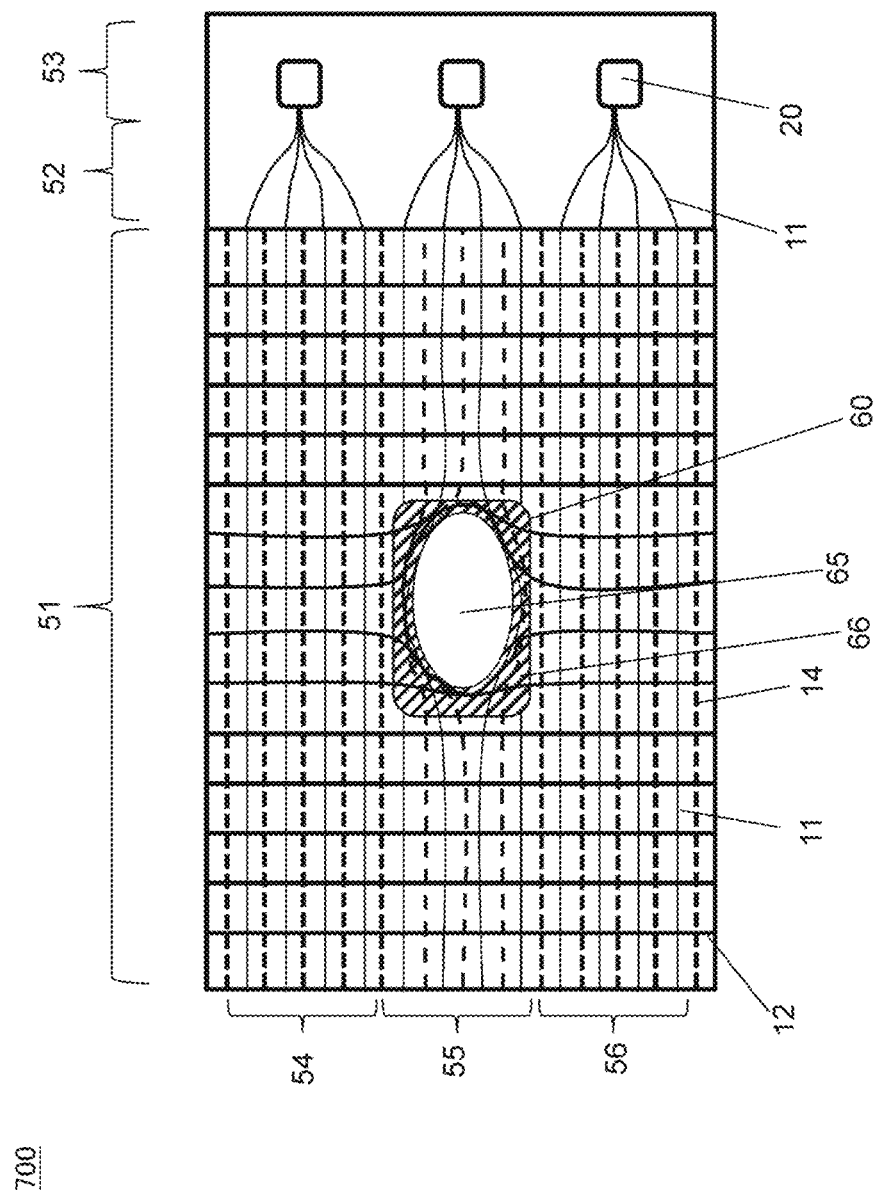
FIG. 13 is a plan view of the woven fabric 700 in the seventh exemplary embodiment.

FIG. 13 is a plan view of the woven fabric 700 in which a reinforcing portion 66 is further provided in FIG. 12B. In FIG. 12B, the first fiber 11 is bent at a corresponding position due to the obstacle 65. Thus, there is a possibility that around the tenth region 60, the position is changed with the lapse of time. Therefore, it is desirable to provide the reinforcing portion 66 around the obstacle 65, or on the outer periphery inside the tenth region 60.

The reinforcing portion 66 is, for example, a tape, an adhesive, or a fixture. Otherwise, as the reinforcing portion 66, another fiber may be additionally provided in a portion of the reinforcing portion 66. That is, in the region of the reinforcing portion 66, the fiber density may be made higher than that in another region.

(As a Whole)

The exemplary embodiments may be combined with each other.

INDUSTRIAL APPLICABILITY

The present disclosure is widely used as a woven fabric. This is used as, for example, a cloth of a door and a ceiling within an automobile, and a cloth of a wall, a ceiling, a chair of, for example, a tram or an airplane. Further, this is also used as a cloth for a wall of a structure, a house, a facility, and a building.

What is claimed is:

1. A woven fabric that are woven with wefts extending in a longitudinal direction and warps extending in a lateral direction, which is perpendicular to the longitudinal direction, and having front and back surfaces in a thick direction, which is perpendicular to the longitudinal and lateral directions, comprising:

a first area where a plurality of first fibers, which are the wefts and optical fibers to illuminate through their outer circumference, are woven with a plurality of second fibers, which are the warps and not optical fibers;

a second area, which is adjacent to the first area in the longitudinal direction, where the first fibers extends from the first area through the second area such that the first fibers are not woven with the second fibers and other fibers that are not the first fibers or the second fibers are disposed on the back surface of the second area; and a third area, which is adjacent to the second area in the longitudinal direction, where light sources to emit lights are disposed such that the first, second and third areas are aligned in this order in the longitudinal direction and the light sources are connected to the first fibers and arranged to emit the lights in the longitudinal direction, wherein the light sources are grouped into three types, each of which emits a different color, wherein a red type of the light sources emits red light, a yellow type of the light sources emits yellow light and a blue type of the light sources emits blue light, among the first fibers, some of the first fibers that are connected to the red type of the light sources are defined as red fibers, some of the first fibers that are connected to the yellow type of the light sources are defined as yellow fibers, and some of the first fibers that are connected to the blue type of the light sources are defined as blue fibers, the second area is formed with four layers accumulated in the thickness direction, each of the four layers being made by weaving the second fibers and the other fibers such that three horizontal gaps, which expand in the longitudinal and lateral directions, are formed between two of the four layers that are adjacent, the horizontal gaps being defined as a top gap, a middle gap and a bottom gap in this order from the front surface to the back surface, each one of the top gap, the middle gap and the bottom gap contains only one of the red fibers, the yellow fibers and the blue fibers.

2. The woven fabric according to claim 1, wherein in the first area, two of the second fibers, which are adjacent, intersect with one of the first fibers and then positions of both of the second fibers are switched in a leno weave.

3. The woven fabric according to claim 1, wherein
the first area has two layers in the thick direction that are a first layer facing the front surface and a second layer facing the back surface,
the other fibers are wefts and extends over the first and second areas,
in the first layer, the first fibers and third fibers are woven with the second fibers,
in the second layer, the first fibers are not woven with the second fibers, and the other fibers are woven with the second fibers,
the woven fabric further comprises a fixing area in which the first fibers and the other fibers are woven with the second fibers.

4. The woven fabric according to claim 3, wherein
in the fixing area, a weaving pattern is repeated in which one of the first fibers is located on rear portions of three of the second fibers and is located on a front portion of one of the second fibers wherein the rear portions of the second fibers face the back surface of the woven fabric and the front portion of the second fibers faces the front surface of the woven fabric.

5. The woven fabric according to claim 3, wherein
in fixing area, a weaving pattern is repeated in which one of the first fibers is located on front portions of 12 or 13 of the second fibers, and is located on a rear portion of one of the second fibers wherein the front portions of the second fibers face the front surface of the woven fabric and the rear portion of the second fibers faces the back surface of the woven fabric.

6. The woven fabric according to claim 1, wherein
a tenth area is located within the first area, and
in the then area, the first fibers are not woven with any fibers.

7. The woven fabric according to claim 1, wherein
the other fibers, which are disposed on the back surface of the second area, are wefts and extend over the first regions from the second area.

* * * * *